United States Patent [19]
Schelkmann

[11] 3,837,385
[45] Sept. 24, 1974

[54] ENVELOPE CLOSURE

[76] Inventor: Wilhelm Schelkmann, Crengeldanzstrasse 58, Witten, Germany

[22] Filed: June 16, 1972

[21] Appl. No.: 263,431

[52] U.S. Cl. .............................. 150/54 B, 156/394
[51] Int. Cl. ............................................... B29h 5/04
[58] Field of Search ............ 156/95, 96, 128 R, 129, 156/394, FM, 394; 150/54 B, 3, 6; 229/65

[56] References Cited
UNITED STATES PATENTS

| 1,513,395 | 10/1924 | Holmes | 150/3 X |
| 1,604,527 | 10/1926 | McCormick | 150/54 B |
| 2,601,568 | 6/1972 | Sussenbach | 229/65 |
| 3,207,647 | 9/1965 | Schelkmann | 156/394 FM |
| 3,325,326 | 6/1967 | Schelkmann | 156/96 |
| 3,730,801 | 5/1973 | Martin | 156/394 FM U X |

FOREIGN PATENTS OR APPLICATIONS

| 92,699 | 11/1959 | Netherlands | 156/96 |

*Primary Examiner*—Donald F. Norton
*Attorney, Agent, or Firm*—Michael S. Striker

[57] ABSTRACT

An elastic wrapper encloses at least a portion of a vehicle tire which is to be repaired. Opposite end portions of the wrapper are overlapped once or several times at a distance from the tire which is enclosed in the elastic wrapper, and an annular reinforcing element may be located in the overlap.

15 Claims, 6 Drawing Figures

PATENTED SEP 24 1974 3,837,385

ENVELOPE CLOSURE

CROSS-REFERENCE TO RELATED APPLICATION

A related application was filed on Feb. 4, 1971 and is copending under Ser. No. 112,816 (now U.S. Pat. No. 3,793,116); it is a streamlined continuation of application Ser. No. 713,514 now abandoned.

BACKGROUND OF THE INVENTION

The present invention relates generally to an envelope closure, and more particularly to a closure for an elastic envelope. Still more particularly the invention relates to a closure for the overlapped ends of an elastic envelope which is particularly suitable for use in the repairing of vehicle tires.

It is already known, and reference may be had in this connection to the aforementioned related application for details, to envelope a vehicle tire which is to be retreated or repaired, in an elastic wrapper or envelope. Before they are accommodated in this wrapper they are coated with a non-vulcanized binding rubber and—assuming the tire is to be retreaded—a tread provided with the desired profile is placed abouts its circumference. Thereupon the tire is accommodated in the elastic wrapper which may enclose it entirely or only in part. The purpose of the wrapper is to provide a fluid-tight chamber about the enclosed parts of the tire, from which chamber air and other volatile components are then withdrawn or expressed.

Of course, it is a prerequisite of this that the wrapper which is placed about the tire be fluid-tight, and it is already known to overlap the opposite end portions of the wrapper and to provide a fluid-tight closure because of the elasticity of the material from which the wrapper is made. In other words, the wraper is somewhat stretched and the overlapped end portions thus engage one another under tension and provide a seal. It is also known to further improve the enclosure by providing the envelope material with a reinforcement in the edge zones of the envelope.

However, the envelope will, in operation, penetrate with portions between the profile provided, particularly if the profile is coarse, and as a result of this it is possible for the two overlapped ends of the envelope to become separated whereby the seal is of course made faulty.

SUMMARY OF THE INVENTION

It is, consequently, an object of the present invention to overcome the aforementioned difficulties of the prior art.

More particularly it is an object of the present invention to provide an improved closure for an envelope of the type here under discussion.

In pursuance of the above objects, and of others which will become apparent hereafter, one feature of the invention resides in an envelope, particularly for use in repairing tires and wherein an elastic wrapper encloses at least a portion of a tire and has opposite end portions. In this envelope the present invention provides the improvement consisting in closure means for the wrapper including at least a single overlap of the end portions at a distance from the tire which is enclosed in the elastic wrapper. Thus, the closure means is entirely spaced from and independent of the tire.

An envelope reinforcement may also be provided in the region of the overlap, preferably accommodated within the overlap, and a band of metal, plastic or other suitable material may also surround the wrapper between the overlap and that portion of the wrapper with which the overlap is juxtaposed. Such a band prevents the overlap from penetrating into the recesses between the profile of a tire accommodated in the wrapper, which could cause the formation of folds or undulations in the wrapper and might result in a faulty seal at the overlap.

Furthermore, an annular or ring member may also be inserted into the overlapping envelope ends, and the tension exerted by the envelope wrapper results in mechanical pressure at the edges of the ring which latter may be of circular, polygonal (e.g., rectangular) or profiled cross-section and serves to reinforce the mechanical sealing pressure. Between the ring which is located within the overlap, and the envelope which contacts the tire accommodated within the envelope, a section of the envelope is provided on which both portions of the envelope lie in juxtaposed relationship flat upon one another. This provides a further seal when a vacuum is established inside the envelope.

To avoid the formation of folds in the unvulcanized material placed about the periphery of the tire accommodated in the envelope, and to produce the generation of a pressure drop at the base of the profiles of the unvulcanized material and through the inherent tension of the material, the invention may also provide for an elastic band to be placed about the profile of the tread strip which in turn surrounds the tire, that is to place such an elastic band within the envelope with inwardly directed tension due to its tendency to contract.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
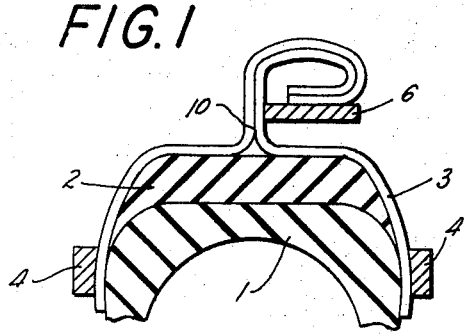
FIG. 1 is a fragmentary illustration showing a portion of a vehicle tire provided with an envelope having a novel closure according to one embodiment of the invention.

Discussing now the drawing in detail, and firstly the embodiment illustrated in FIG. 1, it will be seen that reference numeral 1 denotes a portion of a fragmentarily illustrated vehicle tire, about the outer circumference of which a tread strip 2 is placed. In other words, the vehicle tire 1 is to be retreaded. For the sake of clarity the profiling on the radially outwardly directed surface of the tread strip 2 has been omitted, because it is not essential for an understanding of the invention.

The tire 1 is enveloped, together with the tread strip 2, in an elastic envelope or wrapper 3 which may consist of synthetic plastic material, of a synthetic rubber or other suitable material, and which is shown only in part. Tension rings 4 engage the enevelope 4 at the opposite axial outer sides of the tire 1, air-tightly holding the envelope 3 against the outer sides of the tire 1 as shown.

On the tread surface of the tread strip 2 the two end portions of the envelope—which latter is passed through the center opening of the tire 1 as will be understood, and as is also clearly disclosed in the aforementioned copending application, meet and are made to abut one another in overlying relationship and to be overlapped. An annular deformation resistant band 6 made of metallic material, synthetic plastic material, or another suitable material, is also interposed between the overlapped and juxtaposed surface portion of the wrapper 3, its purpose being to bridge the recesses in the profile or the tread strip 2 to prevent puckering and forming of folds in the envelope 3 which might disadvantageously affect the seal. In a region 10 the overlapped end portions of the envelope 3 abut, and in this region 10 at least the free ends overlie one another in tightly abutting relationship, so that they constitute an air-tight enclosure when a vacuum is produced inside the envelope.

Figure 2:
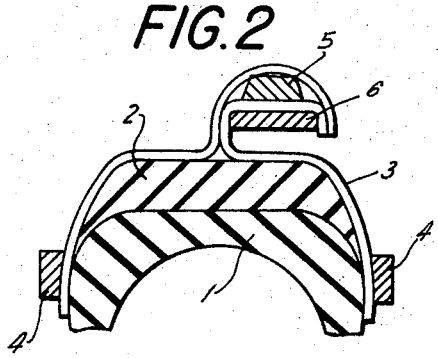
FIG. 2 is a view similar to FIG. 1 but illustrating a different embodiment.

In FIG. 2 I have illustrated an embodiment analogous to that of FIG. 1, but with the addition of an annular reinforcing element 5 which is located in the overlap, and more particularly between the overlapped end portions of the envelope 3 as shown. Element 5 is an additional sealing safeguard, because in the region of engagement with its edges the sealing effect is especially pronounced.

Figure 3:
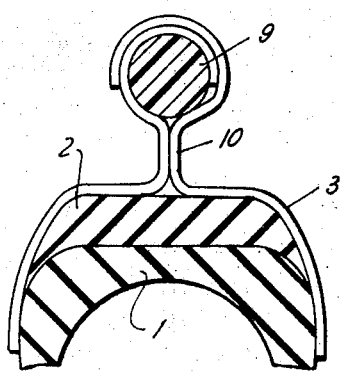
FIG. 3 is a view similar to FIG. 1 illustrating a further embodiment of the invention.
Figure 5:
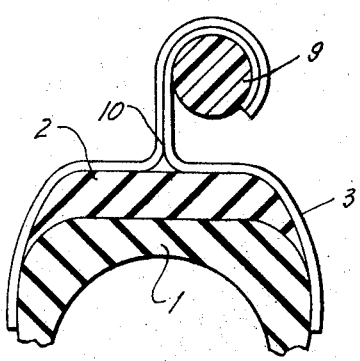
FIG. 5 is a view similar to FIG. 3 illustrating yet an additional embodiment of the invention.

In FIG. 3 I have shown an embodiment in which the end portions of the envelope are not overlapped in surface-to-surface contact in their entirety, but contact one another only at the portion 10 which corresponds to the portion 10 in FIG. 1. For the remainder of their surfaces they do not contact one another in juxtaposed relationship, but instead they are wrapped in mutually opposite directions about a deformation-resistant reinforcing element 9 of annular configuration and, in the embodiment of FIG. 3, of circular cross-section. Element 9 may be made of metallic or synthetic plastic material. It should be noted that in FIG. 3 both the radially inner and the radially outer portions of the element 9 are embraced by the end portions of the envelope 3, which in this embodiment are wrapped about the element 9 in mutually opposite directions. In FIG. 5, however, the end portions overlap one another over their entire surface area in surface-to-surface relationship, analogously to FIG. 1, and are wrapped about the element 9 in only one direction, so that only the radially outer side of the element 9 is embraced.

Figure 4:
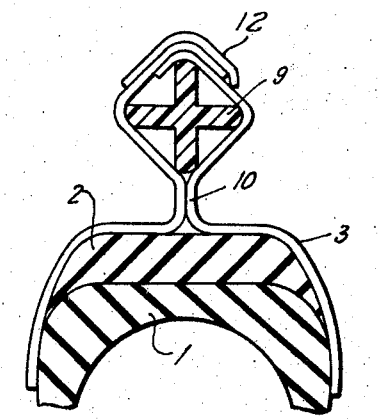
FIG. 4 is a view similar to FIG. 1 illustrating another embodiment of the invention.

Although the embodiments in FIGS. 3 and 5 are advantageous and fully operational, still better closure is obtained if the reinforcing element 9 is not of circular but rather of polygonal cross-section, because the corners thus obtained on the element 9 aid in the sealing effectiveness of the overlapping end portions. One such embodiment is illustrated in FIG. 4 where the annular reinforcing element 9 will be seen to be of polygonal cross-section, and in particular of cruciform cross-section, and in which the end portions of the envelope 3 are again wrapped about the element 9 in mutually opposite directions, embracing both the radially inner and radially outer sides of the element 9. An elastic band 12 may be applied in tensioned condition about the enveloped end portions, as shown, to further balance the sealing effect and prevent displacement of the end portions.

Figure 6:
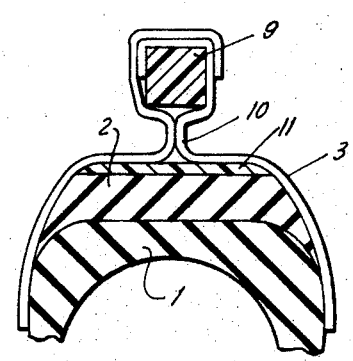
FIG. 6 is a view similar to FIG. 3 illustrating still a further embodiment of the invention.

In FIG. 6, the cross-section of the element 9 is again polygonal, and in particular quadratic or, of course, it may also be rectangular, and the end portions of the envelope 3 are again wrapped about the element 9 in mutually opposite directions, embracing both the radially inner and the radially outer side of the element 9. In the embodiment of FIG. 6 there is further provided an elastic protective band 11, for instance of synthetic material or the like, which is located within the envelope 3 overlying the entire width of the tread surface of tread strip 2. This band 11 has a tendency to contract radially inwardly and assures, particularly in the case of coarse or large treads on the tread strip 2, that the formation of folds in the unvulcanized material and also in the envelope 3 is avoided. Th strap or band 11 prevents the pressure of the envelope on the edges of the tread profiles from being stronger than in the middle, and it brings about a pressure drop at the base of the profile of the tread, due to the tension inherent in the material itself. This has also been disclosed in my aforementioned copending application.

It will be appreciated that with the present invention a substantial improvement is obtained in the sealing effectiveness of the envelope closure. It will also be noted that in all embodiments the actual closure resulting from the overlap and, where present, the reinforcing element, is located spaced and at a distance from the tire accommodated in the envelope wrapper, and is entirely independent of the tire.

It will be understood that each of the elements described above, or two or more together, may also find a useful application in other types of construction differing from the types described above.

While the invention has been illustrated and described as embodied in an envelope closure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an arrangement of the character described in combination, an annular tire wrapper adapted to enclose a tire so that a difference can be established between the pressures interiorly and exteriorly of said tire wrapper such that the exterior pressure is greater than the interior pressure, said annular tire wrapper having two radially outer annular end portions; and an annular reinforcing member surrounding said tire wrapper and having an inner diameter greater than the outer diameter of a tire to be enclosed by said annular tire wrapper, said annular end portions of said tire wrapper being comprised of first parts extending in generally radially outwards direction from the outer periphery of a tire enclosed in said wrapper towards said annular reinforcing member and being in seal-tight contact with each other upon establishment of such pressure difference, and further being comprised of second parts which are lapped over and onto said annular reinforcing member in direction axially of said wrapper and said reinforcing member to cause said first parts of said annular end portions of said wrapper to be subjected to a radially outwardly directed stress, whereby upon establishment of the pressure difference the contacting first parts of said two annular end portions of said wrapper will be prevented from being pulled radially inwards into a recess in the tread of a tire enclosed in said tire wrapper.

2. In an arrangement as defined in claim 1, wherein one of said second parts of said annular end portions is lapped over and onto said annular reinforcing member in one axial direction, and wherein the other of said second parts of said annular end portions is lapped over and onto said annular reinforcing member in the opposite axial direction.

3. In an arrangement as defined in claim 2, wherein said second parts of said two annular end portions are in seal-tight contact with each other.

4. In an arrangement as defined in claim 2, wherein said annular reinforcing member is of circular cross-section in a plane transverse to the elongation of said annular reinforcing member.

5. In an arrangement as defined in claim 1, wherein said second parts of said two annular end portions are both lapped over and onto said annular reinforcing member in the same axial direction.

6. In an arrangement as defined in claim 5, wherein said annular reinforcing member is of circular cross-section in a plane transverse to the elongation of said annular reinforcing member.

7. In an arrangement as defined in claim 1, wherein said annular reinforcing member is of circualar cross-section in a plane transverse to the elongation of said annular reinforcing member.

8. In an arrangement as defined in claim 1, wherein said annular reinforcing member is of polygonal cross-section in a plane transverse to the elongation of said annular reinforcing member.

9. In an arrangement as defined in claim 1, wherein said annular reinforcing member is of cruciform cross-section in a plane transverse to the elongation of said annular reinforcing member.

10. In an arrangement as defined in claim 1, wherein said annular reinforcing member is of rectangular cross-section in a plane transverse to the elongation of said annular reinforcing member.

11. In an arrangement as defined in claim 1, wherein said annular reinforcing member is of metallic material.

12. In an arrangement as defined in claim 1, wherein said annular reinforcing member is of synthetic plastic material.

13. In an arrangement as defined in claim 1, and further including a tensioned elastic band accommodated in said tire wrapper extending circumferentially of a tire enclosed in said wrapper for engagement with the circumference of such tire.

14. In an arrangement as defined in claim 1, and further including an additional annular member coaxial with said annular reinforcing member and located intermediate and in seal-tight contact with said second parts of said two annular end portions.

15. In an arrangement as defined in claim 1, and further including an elastic band radially outwards of said annular reinforcing member and said second parts of said two annular end portions, said elastic band being positioned to exert upon said second parts of said two annular end portions a force tending to hold such parts in position lapped over and onto said annular reinforcing member.

* * * * *